US012611791B2

(12) United States Patent
Huber

(10) Patent No.: US 12,611,791 B2
(45) Date of Patent: Apr. 28, 2026

(54) VERTICAL PANEL SAW HAVING A PANEL-LOWERING DEVICE

(71) Applicant: Striebig AG, Lucerne (CH)

(72) Inventor: Ueli Huber, Grosswangen (CH)

(73) Assignee: Striebig AG, Lucerne (CH)

( * ) Notice: Subject to any disclaimer, the term of this patent is extended or adjusted under 35 U.S.C. 154(b) by 147 days.

(21) Appl. No.: 18/294,684

(22) PCT Filed: Aug. 2, 2022

(86) PCT No.: PCT/CH2022/050018
§ 371 (c)(1),
(2) Date: Feb. 2, 2024

(87) PCT Pub. No.: WO2023/010225
PCT Pub. Date: Feb. 9, 2023

(65) Prior Publication Data

US 2024/0335971 A1 Oct. 10, 2024

(30) Foreign Application Priority Data

Aug. 4, 2021 (CH) .......................... CH070131/2021

(51) Int. Cl.
*B27B 5/07* (2006.01)

(52) U.S. Cl.
CPC ..................................... *B27B 5/07* (2013.01)

(58) Field of Classification Search
CPC ....................................................... B27B 5/07
See application file for complete search history.

(56) References Cited

U.S. PATENT DOCUMENTS 3,340,909 A * 9/1967 Vidal ........................ B27B 5/07 83/574
3,945,285 A * 3/1976 Gebhardt .................. B27B 5/07 83/453
4,150,597 A * 4/1979 Striebig .................... B27B 5/07 83/563
4,183,272 A * 1/1980 Striebig .................... B27B 5/07 83/417

(Continued)

FOREIGN PATENT DOCUMENTS

DE 2305673 A1 8/1974
DE 2813802 A1 10/1978

(Continued)

*Primary Examiner* — Omar Flores Sanchez
(74) *Attorney, Agent, or Firm* — The Webb Law Firm

(57) ABSTRACT

A vertical panel saw includes a frame, a saw unit movably arranged on the frame, and a plurality of panel-lowering devices. The panel-lowering devices each include a height-adjustment device having an adjustment drive and a panel-holding unit for holding a panel, which panel-holding unit is height-adjustably arranged on the height-adjustment device. The height-adjustment device includes a height-adjustable adjustment carriage and the panel-holding unit includes a lifting carriage. The panel-holding unit is kinematically connected to the adjustment drive via a freewheel, the freewheel interrupting the kinematic connection between panel-holding unit and adjustment drive when a panel held by the panel-holding unit is placed on a support.

10 Claims, 7 Drawing Sheets

(56) References Cited

U.S. PATENT DOCUMENTS

| | | | | | |
|---|---|---|---|---|---|
| 4,202,231 | A * | 5/1980 | Striebig | B27B 5/07 83/466 |
| 5,253,400 | A * | 10/1993 | Conachen | B27F 5/12 144/1.1 |
| 2006/0060049 | A1* | 3/2006 | Learnard | B27B 27/02 83/485 |
| 2010/0037742 | A1* | 2/2010 | Learnard | B27B 27/02 83/859 |
| 2018/0345391 | A1* | 12/2018 | Ridgway | B27B 5/29 |
| 2024/0123648 | A1* | 4/2024 | Frykman | B23D 47/02 |

FOREIGN PATENT DOCUMENTS

| | | | |
|---|---|---|---|
| EP | 0004926 | A2 | 10/1979 |
| EP | 2662172 | A1 | 11/2013 |

* cited by examiner

VERTICAL PANEL SAW HAVING A PANEL-LOWERING DEVICE

CROSS REFERENCE TO RELATED APPLICATIONS

This application is the United States national phase of International Patent Application No. PCT/CH2022/050018 filed Aug. 2, 2022, and claims priority to Switzerland Patent Application No. CH070131/2021 filed Aug. 4, 2021, the disclosures of which are hereby incorporated by reference in their entireties.

BACKGROUND OF THE INVENTION

Field of the Invention

The present invention relates to a vertical panel saw having a panel-lowering device as described herein.

Description of Related Art

Vertical panel saws are known from the prior art which comprise a usually approximately vertically upright frame and a saw unit arranged so as to be movable on the frame by means of a saw beam. Panels that are to be sawn, especially made from wood and/or plastics, are placed onto the frame and supported at the bottom by support elements which are often in the form of support rollers. Some vertical panel saws have one or more panel-lowering devices for lifting panels to be sawn or panel parts that have already been sawn and lowering them onto the support elements. Such panel-lowering devices comprise, for example, clamping elements which are lowered onto a panel from above and then clamp the panel in the region of its upper edge. The height of the clamping elements is adjusted with the aid of a height-adjustment device and an adjustment drive.

In order that the panel clamped with the clamping elements can be lowered onto the support elements or the clamping elements can be lowered onto the panel to be grasped without giving rise to damage due to the action of excessively large forces, it is necessary to monitor the lowering operation at various locations using a plurality of sensors, especially if there is an option to add further support elements at other frame heights. Moreover, the height adjustment needs to be very precisely controlled.

In view of the disadvantages of the vertical panel saws known hitherto, the problem underlying the invention is to provide a vertical panel saw having an improved panel-lowering device which minimises the risk of damage associated with the handling of panels and/or reduces the monitoring means necessary for minimising the risks of panel handling.

That problem is solved by the vertical panel saw according to the invention as described herein.

SUMMARY OF THE INVENTION

The core of the invention lies in the following: a vertical panel saw comprises a frame, a saw unit movably arranged on the frame, and a panel-lowering device. The panel-lowering device comprises a height-adjustment device having an adjustment drive and a panel-holding unit for holding a panel, which panel-holding unit is height-adjustably arranged on the height-adjustment device. The height-adjustment device comprises a height-adjustable adjustment carriage and the panel-holding unit comprises a lifting carriage. The panel-holding unit is kinematically connected to the adjustment drive via a freewheel, the freewheel interrupting the kinematic connection between panel-holding unit and adjustment drive when a panel held by the panel-holding unit is placed on a support.

When a panel held by the panel-holding unit is placed on a support, the freewheel prevents excessively large opposing forces from acting on the panel-holding unit and on the height-adjustment device with the adjustment drive, because the forces generated by the adjustment drive are coupled out. That is to say, even if the adjustment drive continues to run, it does not exert on the panel-holding unit any force which presses the panel further against the support, that is to say which counteracts the support force. This prevents damage from being caused as a result of cumulative forces. Exact control of the height adjustment to ensure that the panel held by the panel-holding unit is placed onto the support virtually without force-which also requires suitable monitoring means—is in principle not necessary for this purpose.

The freewheel can in principle also lead to a kinematic decoupling of panel-holding unit and adjustment drive, i.e. to an interruption of the kinematic connection between panel-holding unit and adjustment drive, if, in order grasp a panel, the panel-holding unit is lowered onto the panel from above and the lowering operation is not stopped in good time. Since, however, the panel-holding unit is usually not placed onto the panel without gaps, this is a relatively rare occurrence.

In a preferred embodiment, the lifting carriage is separably supported on the adjustment carriage.

By the separable supporting of the lifting carriage of the panel-holding unit on the adjustment carriage of the height-adjustment device a freewheel can be realised in a simple manner. When the lifting carriage is supported, raising of the adjustment carriage also raises the lifting carriage, with the result that the remaining parts of the panel-holding unit connected thereto are also raised. If, however, during a lowering operation with the lifting carriage supported on the adjustment carriage, the panel-holding unit encounters resistance, for example when a panel held by the panel-holding unit is placed on a support or if the panel-holding unit is lowered onto the panel from above and is stopped too late, the lifting carriage can become separated from the adjustment carriage due to the upwardly acting force. This thus results in freewheeling of the adjustment drive, and the kinematic connection between panel-holding unit and adjustment drive is interrupted.

The height-adjustment device advantageously comprises an adjustment spindle which is rotatable by means of the adjustment drive, and the adjustment carriage is arranged on the adjustment spindle and is adjustable in height by rotation of the adjustment spindle. Such an adjustment spindle is a simple means for effecting a lowering or raising movement of the adjustment carriage with an adjusting force generated by the adjustment drive.

Preferably, the height-adjustment device comprises at least one linear guide on which the panel-holding unit is linearly guided. As a result, the panel-holding unit is held so as to be stably adjustable; it is adjustable, for example slidable, relative to the linear guide only in one direction and its opposite direction.

Advantageously, the panel-holding unit has a separation sensor which detects the separation of the lifting carriage from the adjustment carriage. Such a separation sensor makes it possible to react to the separation of the lifting carriage from the adjustment carriage and, for example, to stop the adjustment drive or even to move the adjustment drive (briefly) in the opposite direction until the adjustment carriage is in contact with the lifting carriage again and, via the lifting carriage, the panel-holding unit is supported by the adjustment carriage again.

The panel-holding unit is advantageously a clamping unit having a fixed clamping jaw and a movable clamping jaw, between which a panel can be clamped, the movable clamping jaw being movable, preferably linearly guided, towards the fixed clamping jaw by means of a clamping jaw drive, preferably a pneumatic clamping jaw drive. The gripping and secure holding of a panel with the panel-holding unit can thus be realised in a simple manner.

In an advantageous embodiment, at least one supply line of the panel-holding unit is guided via two deflection rollers from a static region of the vertical panel saw to the panel-holding unit, one of the two deflection rollers being arranged to be movable in such a way that the higher the position of the panel-holding unit, the greater the spacing between the two deflection rollers. Preferably, the movably arranged deflection roller is pretensioned in a direction away from the other deflection roller. The guiding of a supply line of the panel-holding unit via the two deflection rollers which are arranged to be movable relative to one another provides an arrangement of the at least one supply line that is as defined and space-saving as possible in all adjustment positions of the panel-holding unit. The at least one supply line never simply hangs down in a loose and undefined way.

Advantageously, the panel-lowering device comprises pulling means, preferably a tension spring or at least one magnet, which pull the lifting carriage towards the adjustment carriage. Such pulling means serve to pull the lifting carriage towards the adjustment carriage, if this is possible, that is to say if this is not prevented by the panel-holding unit, with or without a panel, being supported on a support. In this way the kinematic connection between panel-holding unit and adjustment drive is ensured as quickly and as well as possible.

Preferably, the vertical panel saw comprises two or more panel-lowering devices which are preferably adjustable synchronously. A panel can be held more stably with two or more panel-lowering devices than with only one panel-lowering device. Moreover, it is thus possible to lift heavier weights.

Advantageously, the vertical panel saw comprises a control device for controlling the panel-lowering device or the two or more panel-lowering devices, as the case may be. Such a control device especially makes it possible also to effect targeted control of a plurality of panel-lowering devices, especially by an operator but possibly also automatically by a control program.

BRIEF DESCRIPTION OF THE DRAWINGS

The terms FIG., FIGS., Figure, and Figures are used interchangeably in the specification to refer to the corresponding figures in the drawings.

The vertical panel saw according to the invention is explained in greater detail below with reference to an exemplary embodiment shown in the drawings, wherein.

DESCRIPTION OF THE INVENTION

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures. References to positions and directions, such as above, below, upwards, downwards, relate to the typical arrangement of the vertical panel saw shown in the Figures.

Figure 1:
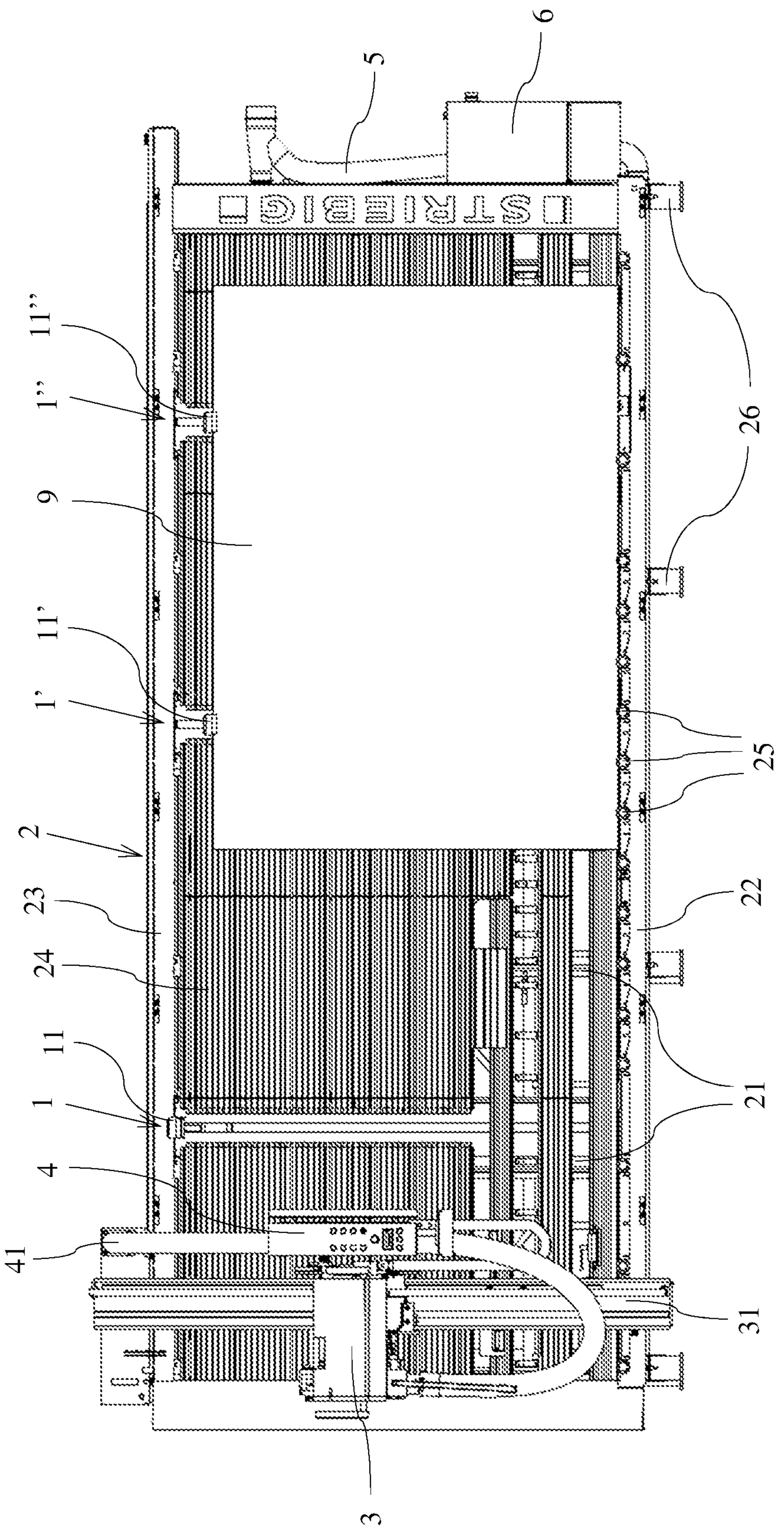
FIG. 1—is a front view of an exemplary embodiment of a vertical panel saw according to the invention with a panel held by two panel-lowering devices.

FIG. 1 shows an exemplary embodiment of a vertical panel saw according to the invention on which a panel 9 to be sawn is arranged and held. The vertical panel saw has a frame 2 which comprises a plurality of vertical bars 21, a lower crossbar 22, an upper crossbar 23 and a support grid 24 arranged thereon for supporting the rear side of panels to be sawn, as well as a number of feet 26. Distributed over the length of the lower crossbar 22 and projecting therefrom are a multitude of support elements in the form of support rollers 25 which serve as vertical support for panels to be sawn. In FIG. 1, the panel 9 is supported on eight such support rollers 25.

The vertical panel saw further comprises three mutually spaced, identically constructed panel-lowering devices 1, 1' and 1", with which panels to be sawn can be securely held, lifted and lowered. The panel-lowering devices 1, 1', 1" each have a height-adjustably arranged panel-holding unit 11, 11', 11" which are able to grip from above over the upper edge of a panel to be sawn. In FIG. 1, the panel-holding unit 11 of the panel-lowering device 1 is located in its upper end position, while the panel-holding unit 11' of the panel-lowering device 1' and the panel-holding unit 11" of the panel-lowering device 1" have grasped the panel 9 at its upper end and are holding it securely. The panel-holding units 11' and 11" have been lowered a short distance downwards away from their respective upper end positions.

For sawing the panels, in known manner the vertical panel saw has a saw unit 3 which is arranged on a saw beam 31 so as to be adjustable in height, that is to say substantially vertically adjustable, and which is pivotable between a vertical cutting position, in which a vertical cut can be performed, and a horizontal cutting position, in which a horizontal cut can be performed. The saw beam 31 is guided on the frame 2 so as to be movable in a longitudinal direction of the lower and upper crossbars 22, 23, so that by longitudinal or horizontal displacement of the saw beam 31 with the saw unit 3 arranged thereon it is possible to perform a horizontal cut. A vertical cut can be performed by adjustment of the height of the saw unit 3 along the saw beam 31.

The vertical panel saw shown in FIG. 1 further comprises, likewise in known manner, an extraction device 5 for extracting sawdust and a switch cabinet 6.

Finally, the vertical panel saw comprises a control device 4 for controlling especially the saw unit 3, the panel-lowering devices 1, 1', 1" and the extraction device 5. The control device 4 is arranged on a control beam 41 which is adjustably guided on the frame 2 in a longitudinal direction of the upper crossbar 23, that is to say, like the saw beam 31, it is longitudinally and horizontally displaceable.

Figure 2:
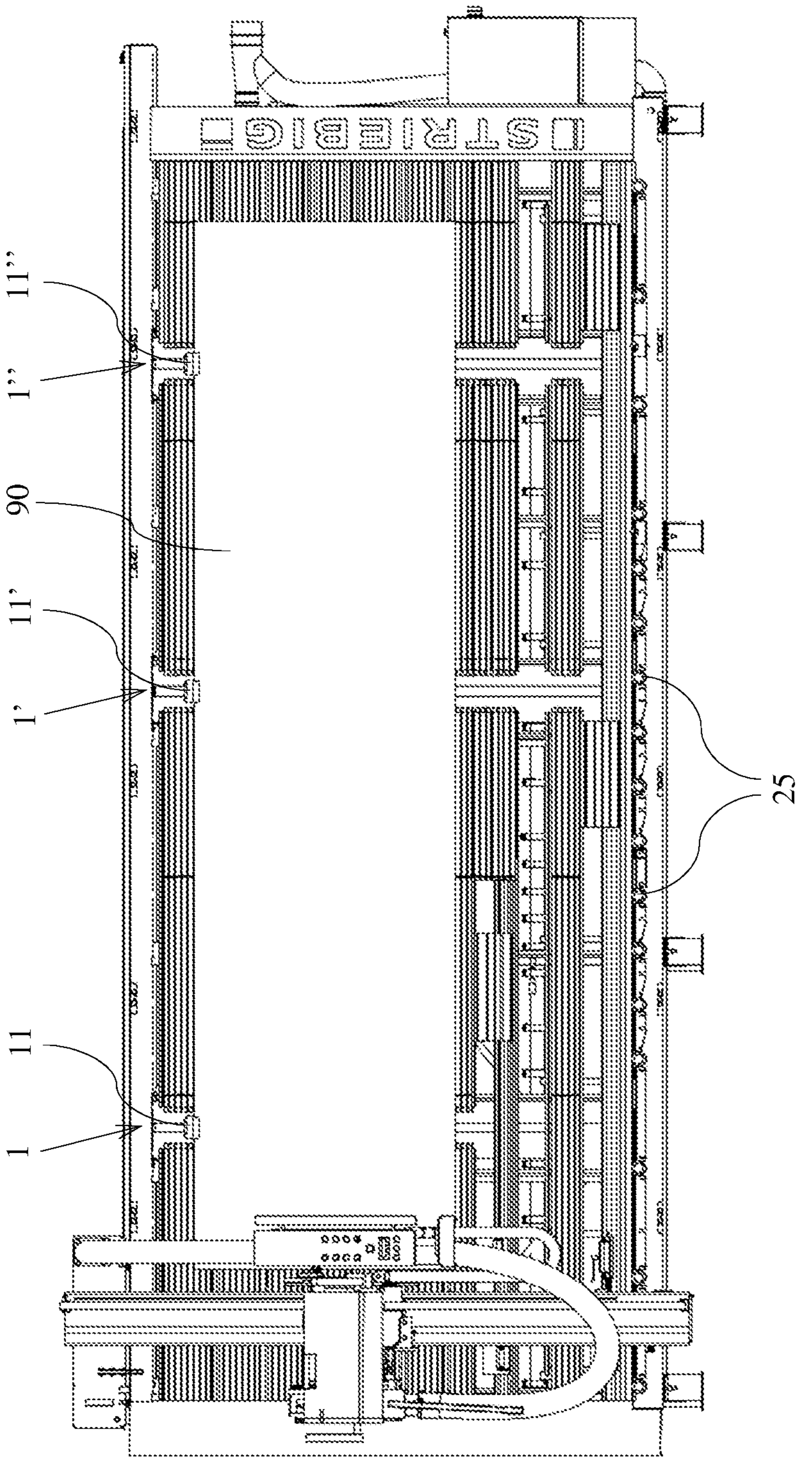
FIG. 2—shows the vertical panel saw of FIG. 1 with a different panel held by three panel-lowering devices.

FIG. 2 shows the same vertical panel saw as FIG. 1 but here, instead of the panel 9, a panel 90 is arranged thereon. The panel 90 is much longer and narrower than the panel 9 and is held by the panel-holding units 11, 11', 11" of all three panel-lowering devices 1, 1', 1". In the position shown, it has been lifted off the support rollers 25.

Figure 3:
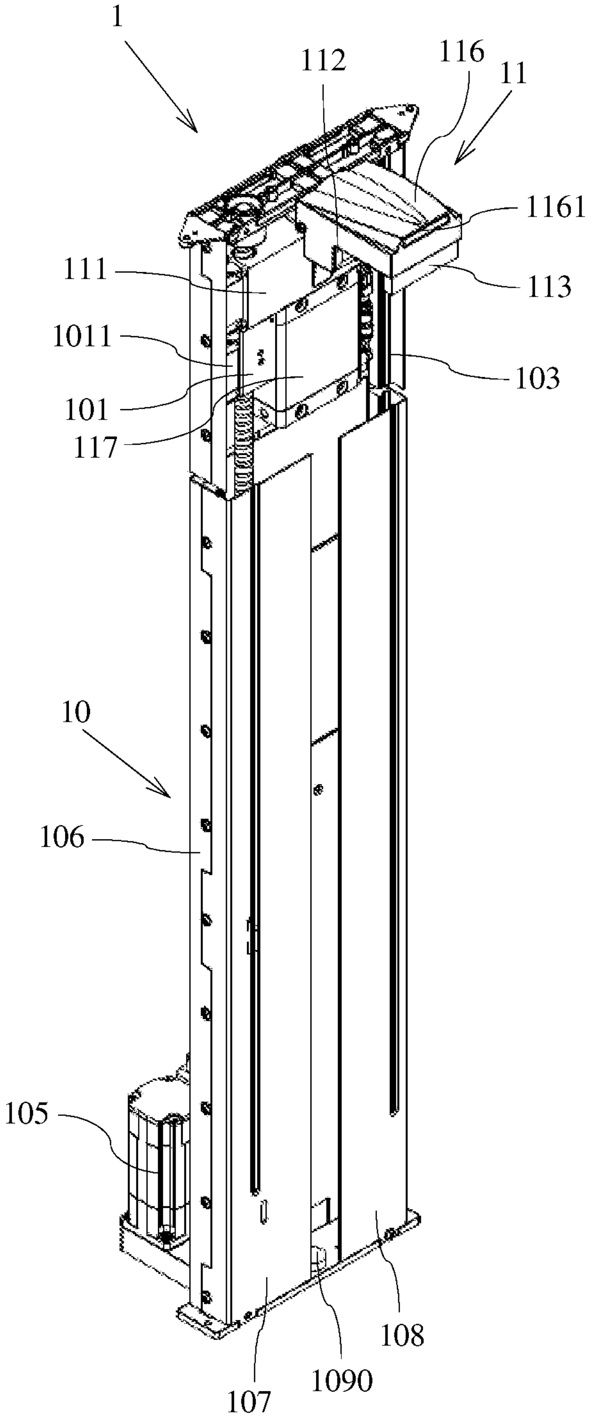
FIG. 3—is a perspective view of a panel-lowering device of the vertical panel saw of FIG. 1, seen obliquely from the front.
Figure 4:
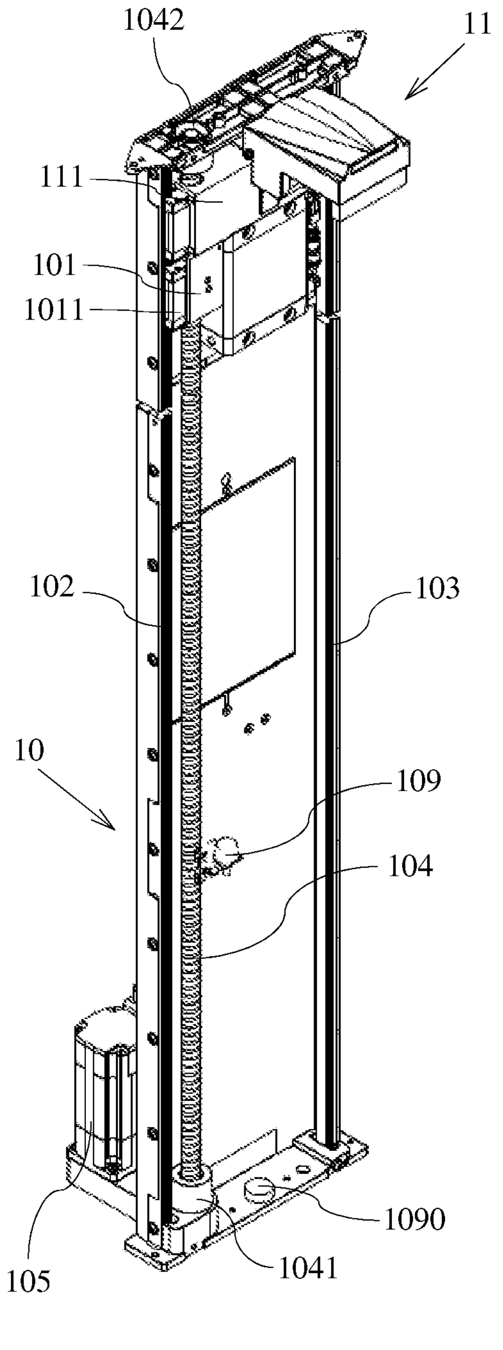
FIG. 4—is a perspective view of the panel-lowering device of FIG. 3, seen obliquely from the front, without the front casing.
Figure 5:
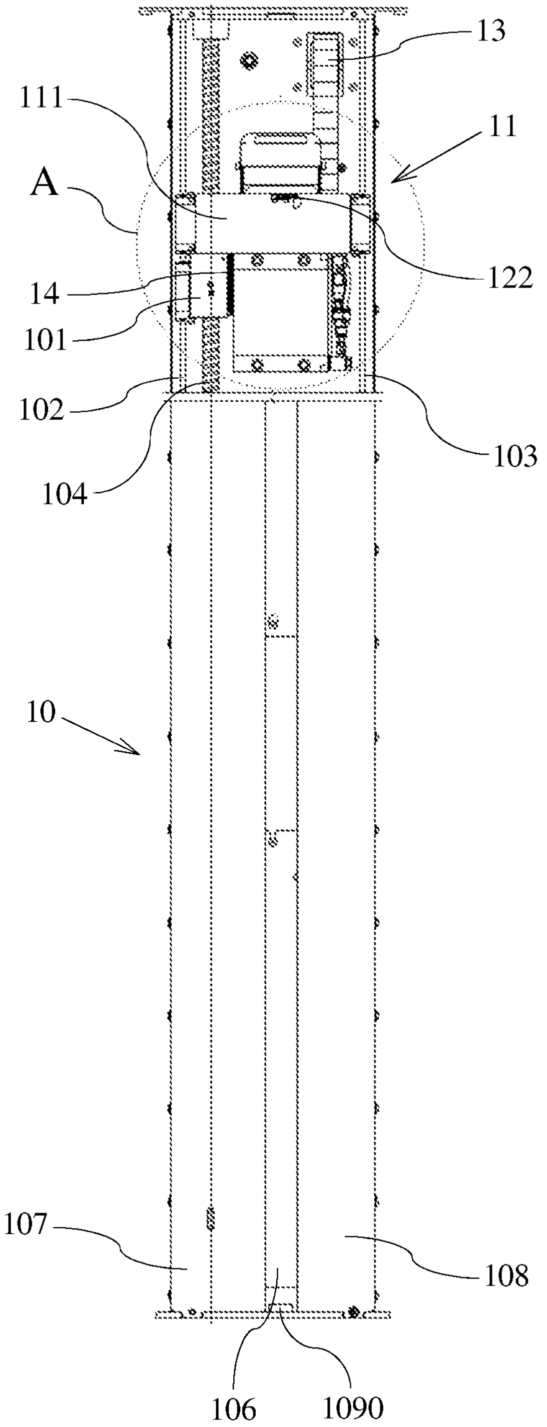
FIG. 5—is a front view of the panel-lowering device of FIG. 3.
Figure 7:
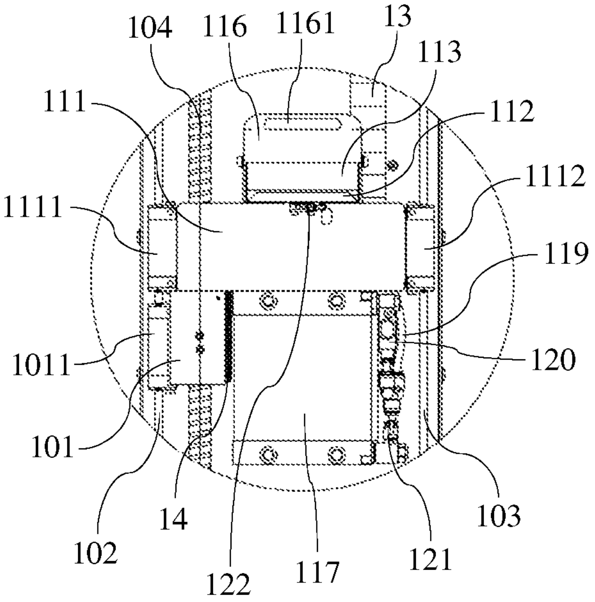
FIG. 7—is an enlarged view of detail A of FIG. 5.

FIGS. 3-5 show—representative of the identically constructed panel-lowering devices 1, 1', 1"—the panel-lowering device 1 in a perspective view seen obliquely from the front (FIG. 3), in a perspective view seen obliquely from the front without the front casing (FIG. 4) and in a front view (FIG. 5). FIG. 7 shows an enlarged view of detail A of FIG. 5.

The panel-lowering device 1 comprises a height-adjustment device 10 and a panel-holding unit 11 for holding a panel, which panel-holding unit is height-adjustably arranged on the height-adjustment device 10, that is to say is substantially vertically adjustable.

The height-adjustment device 10 comprises a height-adjustable adjustment carriage 101, which is arranged on an adjustment spindle 104 rotatably mounted in a lower spindle bearing 1041 and an upper spindle bearing 1042 and the height of which is adjustable by rotation of the adjustment spindle 104. For that purpose, the adjustment carriage 101 has an internal thread complementary to the external thread of the adjustment spindle 104 and thus forms a kind of spindle nut which is arranged so as to be fixed against rotation and is therefore adjusted in height on rotation of the adjustment spindle 104. Rotation of the adjustment carriage 101 is prevented by the adjustment carriage being rigidly connected to a runner 1011 which is able to slide up and down in a substantially vertical direction on a substantially vertically arranged linear guide 102.

Figure 10:
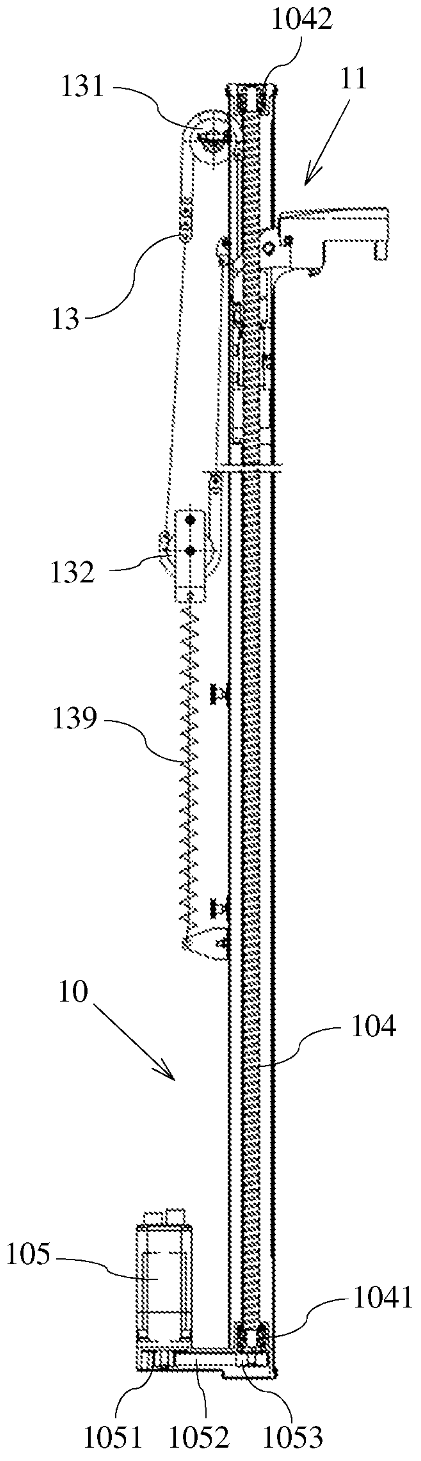
FIG. 10—is a partly diagrammatic side view of the panel-lowering device of FIG. 5, in which housing parts of the height-adjustment device have been omitted.
Figure 12:
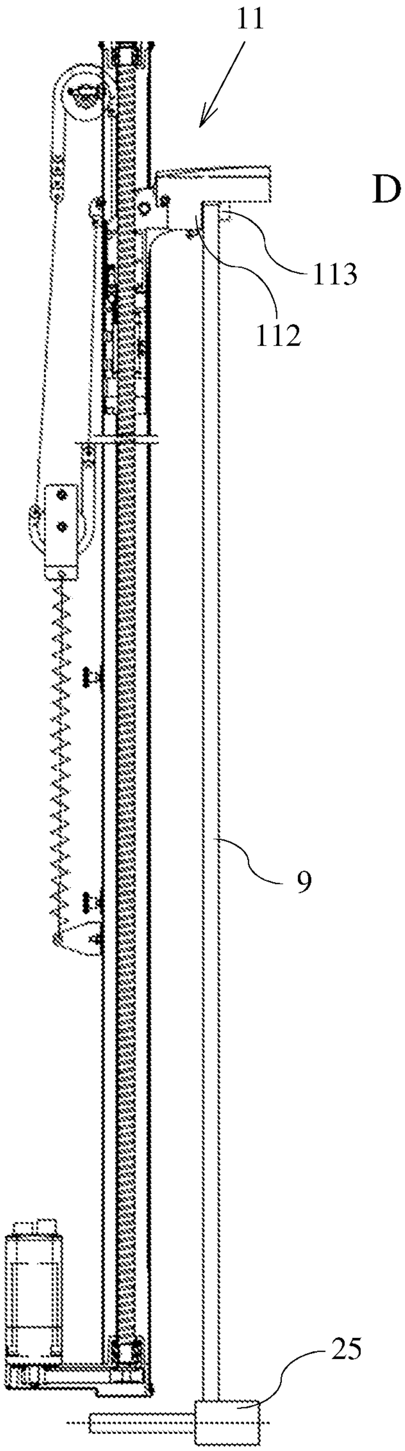
FIG. 12—is a partly diagrammatic side view of the panel-lowering device corresponding to FIG. 11, showing a panel being held and showing the support for the panel.
Figure 13:
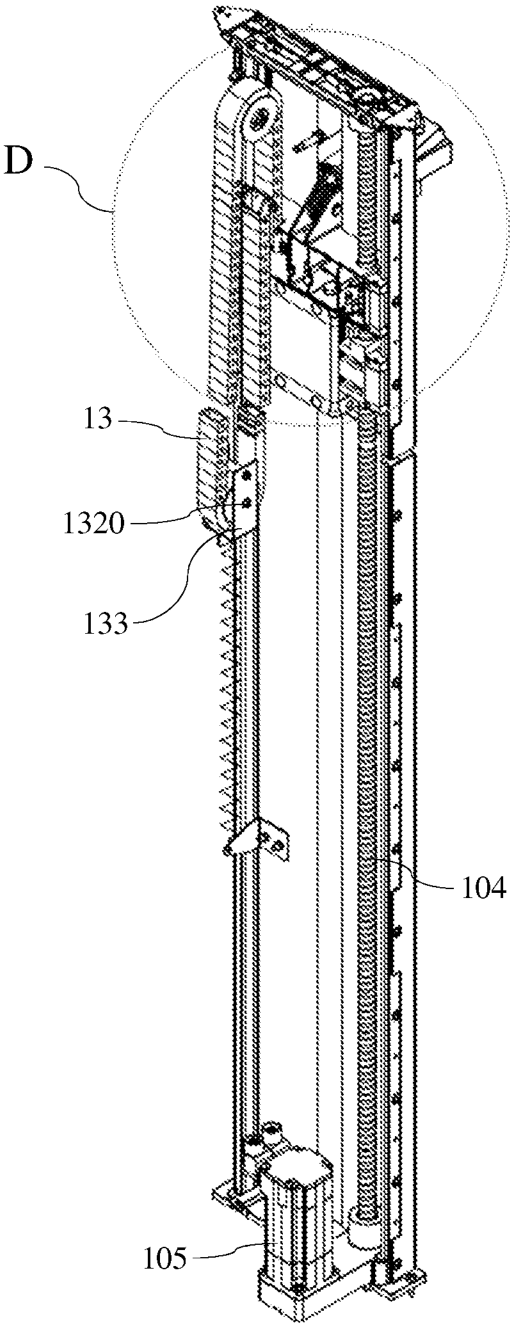
FIG. 13—is a perspective view of the panel-lowering device of FIG. 3, seen obliquely from the rear, without the rear casing.

The rotation of the adjustment spindle 104 is effected with an adjustment drive 105 in the form of a servomotor which—as can best be seen in FIGS. 10 and 12—drives a toothed belt 1052 via a drive pulley 1051, which toothed belt in turn drives an output pulley 1053 which turns the adjustment spindle 104. In the other Figures, the drive pulley 1051, the toothed belt 1052 and the output pulley 1053 are either hidden by housing parts or are not visible on account of the view chosen.

The panel-holding unit 11 comprises a lifting carriage 111 which in a normal situation according to FIGS. 3-5 and 7 is separably supported on the adjustment carriage 101. The lifting carriage 111 and the adjustment carriage 101 are connected to one another via a tension spring 14 which pulls the lifting carriage 111 towards the adjustment carriage 101. The lifting carriage 111 is provided on the left and on the right with a runner 1111 and 1112, respectively, the runner 1111 being able to slide up and down in a substantially vertical direction on the linear guide 102, and the runner 1112 being able to slide up and down in a substantially vertical direction on a substantially vertically arranged linear guide 103 parallel to the linear guide 102. The panel-holding unit 11 is thus linearly guided by the two linear guides 102, 103.

The lifting carriage 111 carries a clamping unit having a fixed clamping jaw 112 and a movable clamping jaw 113, between which a panel can be clamped. Below the fixed clamping jaw 112 there is arranged a panel edge sensor 122 for detecting the edge of a panel. The movable clamping jaw 113 is movable towards the fixed clamping jaw 112 by means of a clamping jaw drive described hereinbelow. Above the clamping jaws 112, 113 and the clamping jaw drive, the clamping unit has a cover 116 having an LED display 1161. By means of the LED display 1161, the operating state of the panel-lowering device 1 can be displayed, for example "descending", "ascending", "movable clamping jaw 113 being adjusted", "lifting carriage 111 supported on adjustment carriage 101", "lifting carriage 111 separated from adjustment carriage 101", etc.

Below the lifting carriage 111 there is a tensioning cylinder housing 117 in which there is arranged inter alia a pneumatic cylinder 118 for adjusting the movable clamping jaw 113, which pneumatic cylinder can be seen in FIGS. 9 and 11. The pneumatic cylinder 118 can be supplied with compressed air and controlled via a pneumatic hose 119, an unlockable non-return valve 120 and a throttle valve 121, see especially FIG. 7.

Figure 6:
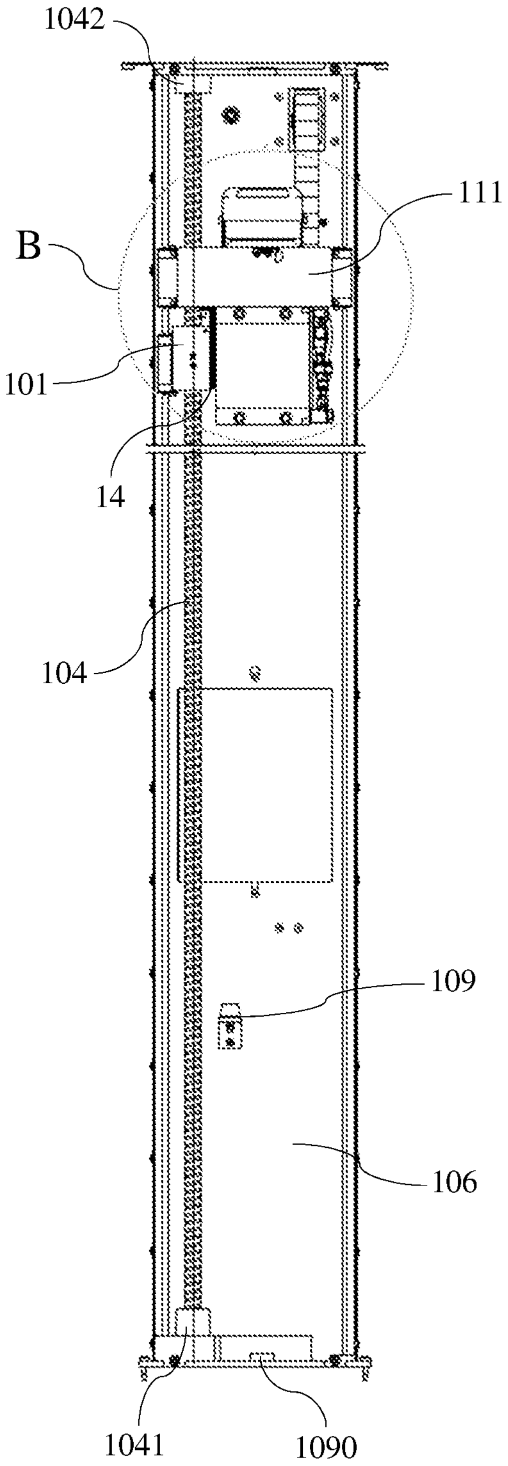
FIG. 6—is a front view of the panel-lowering device of FIG. 5 without the front casing, but with the lifting carriage separated from the adjustment carriage.

As can best be seen in FIGS. 3 and 5, the panel-lowering device 1 has a rear housing wall 106 and two front housing wall portions 107 and 108. In FIGS. 4 and 6, the panel-lowering device 1 is shown without the two front housing wall portions 107, 108, which allows a view of the adjustment spindle 104 and a central support stop 109 for the panel-holding unit 11, which central support stop is mounted on the rear housing wall 106. The central support stop 109 is optionally removable and in that case a lower stop 1090 for the panel-holding unit 11 is provided.

Figure 8:
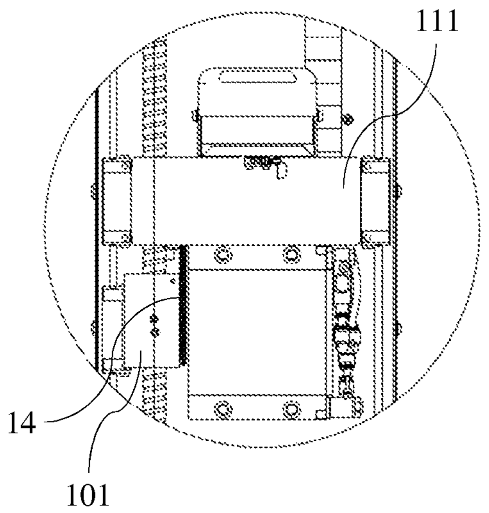
FIG. 8—is an enlarged view of detail B of FIG. 6.

In contrast to FIGS. 3-5 and 7, FIG. 6 shows the panel-lowering device 1 with the lifting carriage 111 separated from the adjustment carriage 101. FIG. 8 shows an enlarged view of detail B of FIG. 6.

Starting from the situation shown in FIGS. 3-5 and 7, the situation shown in FIGS. 6 and 8 is reached in particular if, during a lowering operation with the lifting carriage 111 supported on the adjustment carriage 101, the panel-lowering device 1 encounters resistance, for example when a panel held by the panel-holding unit 11 is placed on a support, for example on the support rollers 25, or if the panel-holding unit 11 is lowered onto the panel from above and is stopped too late. As a result of the upwardly acting force, the lifting carriage 111 has become separated from the adjustment carriage 101, because the adjustment carriage 101 has been moved further downwards, while the lifting carriage 111 has remained stationary. The kinematic connection between panel-holding unit 11 and adjustment drive 105 is thus interrupted, because the movement of the adjustment carriage 101 is no longer being transmitted to the lifting carriage 111. This corresponds to freewheeling of the adjustment drive 105 in relation to the panel-holding unit 11.

As soon as, after an upward movement of the adjustment carriage 101, the latter comes into contact with the lifting carriage 111 again, a kinematic connection between the adjustment drive 105 and the lifting carriage 111 is re-established, that is to say an upward movement generated by the adjustment drive 105 is transmitted directly to the lifting carriage 111 via the adjustment carriage 101.

Once a panel carried by the panel-holding unit 11, for example the panel 9, has been placed onto the support rollers 25, in order to obtain an optimum force distribution it can be advisable briefly to raise the adjustment carriage 101 again directly after the placement of the panel in order that the lifting carriage 111 is supported on the adjustment carriage 101 again.

In the situation shown in FIGS. 6 and 8, the tension spring 14, which is attached by one end to the underside of the lifting carriage 111 and by the other end to the side of the adjustment carriage 101, has been stretched and tensioned and is pulling the lifting carriage 111 more strongly towards the adjustment carriage 101. However, as long as the panel 9 held by the panel-holding unit 11 is supported on the support rollers 25 and thus an irresistible counterforce to the spring force and the weight force of the panel-holding unit 11 is in effect, the lifting carriage 111 does not move. The purpose of the tension spring 14 is especially to move the lifting carriage 111 towards the adjustment carriage 101 if no irresistible counterforce is present, but the weight force of the panel-holding unit 11 may not be sufficient to overcome counterforces (such as, for example, frictional forces or the supply lines pulling the panel-holding unit 11 upwards). This is usually only the case if the panel-holding unit 11 is not holding a panel.

Instead of being generated by the tension spring 14, the attractive force between adjustment carriage 101 and lifting carriage 111 can alternatively also be generated by a magnet or a plurality of magnets.

Figure 14:
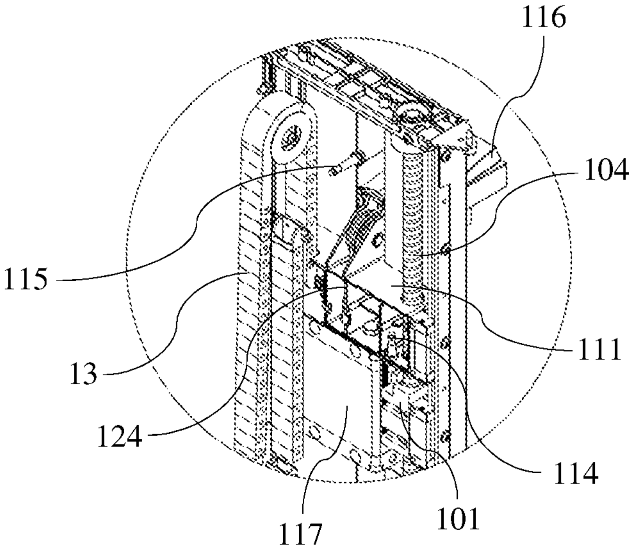
FIG. 14—is an enlarged view of detail D of FIG. 13.
Figure 9:
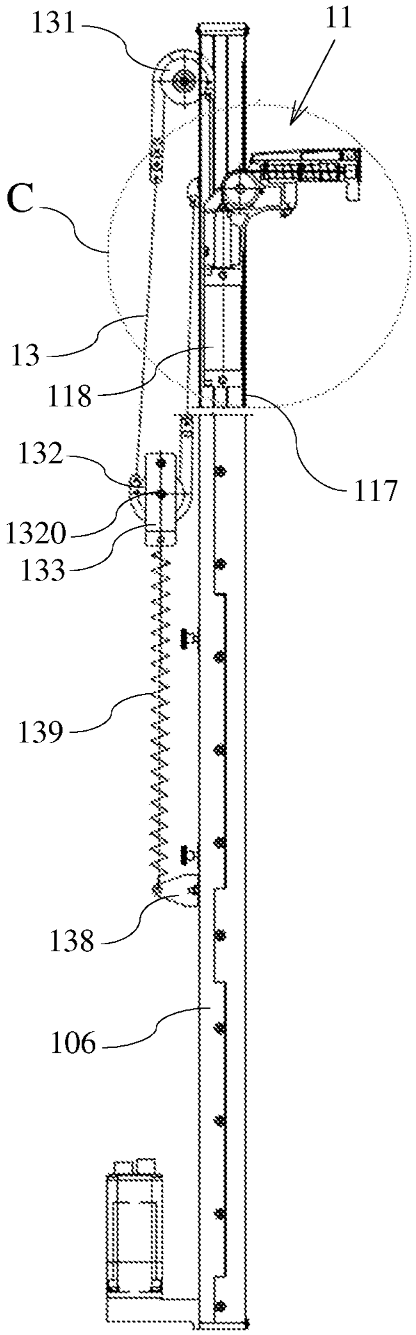
FIG. 9—is a partly diagrammatic side view of the panel-lowering device of FIG. 5, in which housing parts of the panel-holding unit have been omitted.

FIGS. 9, 10, 12 and 13 show the panel-lowering device 1, partly in diagrammatic form, from the side in various sectional views and in a perspective view seen obliquely from the rear. FIG. 11 shows an enlarged view of detail C of FIG. 9 and FIG. 14 shows an enlarged view of detail D of FIG. 13.

FIG. 12 shows how a panel 9 is clamped between the fixed clamping jaw 112 and the movable clamping jaw 113 and thus held by the panel-holding unit 11, while being simultaneously supported on the support rollers 25.

Figure 11:
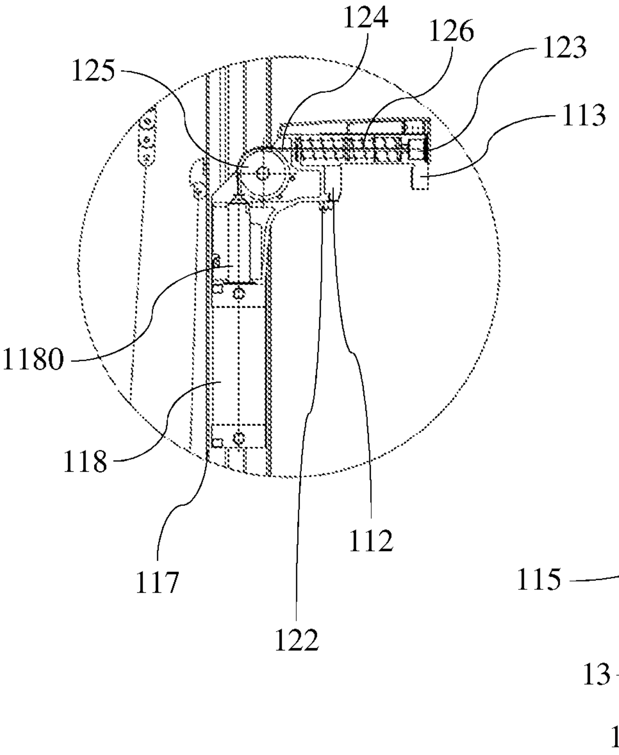
FIG. 11—is an enlarged view of detail C of FIG. 9.

It can be seen from FIGS. 9 and 11 that the movable clamping jaw 113 is mounted on a tensioning carriage 123 which is connected to a tensioning cylinder piston 1180 of the pneumatic cylinder 118 by means of a tensioning cable 124 guided over a cable pulley 125. A restoring spring 126 ensures that the tensioning carriage 123 with the movable clamping jaw 113 is pretensioned in a direction away from the fixed clamping jaw 112. As can be seen especially in FIG. 7, the pneumatic cylinder 118 can be supplied with compressed air and controlled via a pneumatic hose 119, an unlockable non-return valve 120 and a throttle valve 121. In this way the clamping unit with the fixed clamping jaw 112 and the movable clamping jaw 113 is adjustable by means of a pneumatic clamping jaw drive, which is in turn controllable by the control device 4.

The pneumatic hose 119 is a supply line which is guided from a static region of the vertical panel saw to the panel-holding unit 11. To prevent the hose from hanging down in a loose and undefined way in the wide variety of adjustment positions of the panel-holding unit 1, in a static upper region of the panel-lowering device 1 the pneumatic hose 119 is guided into the interior of a chain 13, see especially FIGS. 5 and 7, which is guided around two deflection rollers 131, 132 to the pneumatic cylinder 118 in the interior of the tensioning cylinder housing 117, see especially FIGS. 9-14, in which the chain 13 is shown partly in diagrammatic form simply as a line. While the upper deflection roller 131 is mounted in fixed position close to the upper end of the panel-lowering device 1, the lower deflection roller 132 is arranged so as to be movable and suspended. The pivot shaft 1320 of the lower deflection roller 132 is mounted in an angled 25 part 133. The angled part 133 is connected to one end of a tension spring 139, the other end of which is connected to a fastening element 138 mounted on the rear housing wall 106. The tension spring 139 pulls the angled part 133 downwards and thus pretensions the movably arranged lower deflection roller 132 in a direction away from the upper deflection roller 131. This has the result that the higher the position of the panel-holding unit 11, the greater the spacing between the two deflection rollers 131, 132, the chain 13 being under tension to some extent at all times, that is to say it does not simply hang down in a loose and undefined way. Such an arrangement with the chain 13 guided around two deflection rollers 131, 132 is also relatively space-saving.

In FIG. 14 it can seen that in the lifting carriage 111 of the panel-holding unit 11 there is arranged a (preferably inductive) separation sensor 114 which detects the separation of the lifting carriage 111 from the adjustment carriage 101. This makes it possible to react to the separation of the lifting carriage 111 from the adjustment carriage 101 and, for example, to stop the adjustment drive 105 or even to move the adjustment drive briefly in the opposite direction until the adjustment carriage 101 is in contact with the lifting carriage 111 again and, via the lifting carriage 111, the panel-holding unit 11 is supported by the adjustment carriage 101 again.

Furthermore, in a static upper region of the panel-lowering device 1 there is arranged a (preferably inductive) reference sensor 115 with which the position of the panel-holding unit 11 can be determined.

The invention claimed is:

1. A vertical panel saw having a frame, a saw unit movably arranged on the frame, and a panel-lowering device, wherein the panel-lowering device comprises a height-adjustment device having an adjustment drive and a panel-holding unit for holding a panel, which panel-holding unit is height-adjustably arranged on the height-adjustment device, wherein the height-adjustment device comprises a height-adjustable adjustment carriage and the panel-holding unit comprises a lifting carriage, and the panel-holding unit is kinematically connected to the adjustment drive in a freewheeling manner, the freewheeling interrupting the kinematic connection between panel-holding unit and adjustment drive when a panel held by the panel-holding unit is placed on a support.

2. The vertical panel saw according to claim 1, wherein the lifting carriage is separably supported on the adjustment carriage.

3. The vertical panel saw according to claim 1, wherein the height-adjustment device comprises an adjustment spindle which is rotatable by means of the adjustment drive, and the adjustment carriage is arranged on the adjustment spindle and is adjustable in height by rotation of the adjustment spindle.

4. The vertical panel saw according to claim 1, wherein the height-adjustment device comprises at least one linear guide on which the panel-holding unit is linearly guided.

5. The vertical panel saw according to claim 2, wherein the panel-holding unit has a separation sensor which detects the separation of the lifting carriage from the adjustment carriage.

6. The vertical panel saw according to claim 1, wherein the panel-holding unit is a clamping unit having a fixed clamping jaw and a movable clamping jaw, between which a panel can be clamped, the movable clamping jaw being movable, preferably linearly guided, towards the fixed clamping jaw by means of a clamping jaw drive, preferably a pneumatic clamping jaw drive.

7. The vertical panel saw according to claim 1, wherein at least one supply line of the panel-holding unit is guided via two deflection rollers from a static region of the vertical panel saw to the panel-holding unit, one of the two deflection rollers being arranged to be movable in such a way that the higher the position of the panel-holding unit, the greater the spacing between the two deflection rollers, the movably arranged deflection roller preferably being pretensioned in a direction away from the other deflection roller.

8. The vertical panel saw according to claim 1, wherein the panel-lowering device comprises pulling means, preferably a tension spring or at least one magnet, which pull the lifting carriage towards the adjustment carriage.

9. The vertical panel saw according to claim 1, wherein it comprises two or more panel-lowering devices which are preferably adjustable synchronously.

10. The vertical panel saw according to claim 1, wherein it comprises a control device for controlling the panel-lowering device or the two or more panel-lowering devices, as the case may be.

* * * * *